A. D. LEE.
FLOWER-POT AND VASE.

No. 173,480. Patented Feb. 15, 1876.

WITNESSES:
J. B. Holderby
B. Coventry

INVENTOR.
Alfred D. Lee,
per R. S. & A. P. Lacey
ATTORNEY.

UNITED STATES PATENT OFFICE.

ALFRED D. LEE, OF SCIO, OHIO.

IMPROVEMENT IN FLOWER POTS AND VASES.

Specification forming part of Letters Patent No. 173,480, dated February 15, 1876; application filed January 8, 1876.

*To all whom it may concern:*

Be it known that I, ALFRED D. LEE, of Scio, in the county of Harrison and State of Ohio, have invented certain new and useful Improvements in Flower-Pots, Vases, and Ornamental Forms; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in the manufacture of flower-pots, vases, and ornamental forms, used in the cultivation and propagation of flowers and other plants; and consists in a pot, vase or ornamental form made from a web of turf or grass-sod, cut into suitable outline and folded into the desired shape and tied by a cord or other wrapping material wound about it, as hereinafter fully explained.

Figure 1:
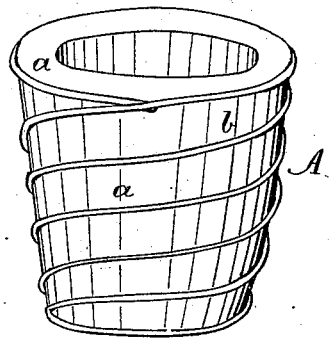
Figure 2:
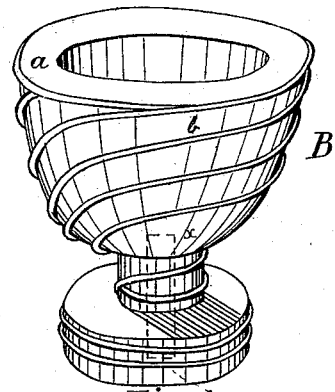
Figure 3:
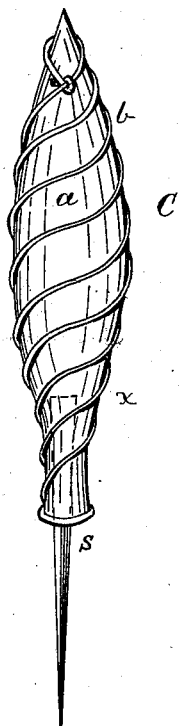
Figure 4:
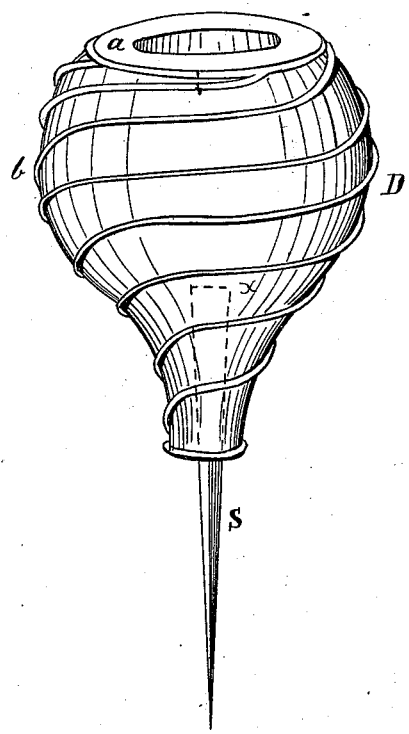

In the drawings, which represent my invention, Figure 1 is a pot of ordinary shape; and Figs. 2, 3, and 4 show vases and ornamental forms made according to my invention.

In carrying out my invention I cut from the surface of a well-sodded piece of ground—sod from ground covered with what is commonly known as wild or swamp grass is preferred, because of the greater strength and tenacity of the interwoven grass-roots—a web or plat of suitable thickness and superficial dimensions to make the desired pot, vase, or form.

This web, by reason of the great number of grass-roots which are interwoven all through it, possesses a strength and flexibility which permits it to be cut, handled, and folded at pleasure without injury to its structure. From this web I cut the required outline, which, when folded, will give the desired form of pot, vase, or form.

In folding the web I use a suitable mold to give the desired contour to the pot, &c., and to hold said web in proper position until wrapped and tied.

*a* is the turf or sod, and *b* the cord or wire wrapped about the pot to hold the turf in position.

The cord need not be tied at every turn, for, if it be drawn tight about the pot, it will sink slightly into the turf, and will be held firmly in place.

In making such forms as shown in Figs. 3, 4, and 5, I employ a small standard or support of wood, *s*, to give strength to the weaker and slender portions, and in Figs. 4 and 5 it is extended below and into the ground to hold the vase or form in an upright position.

The pot, vase, or form, after being made as described, is filled with earth or earth-mold, in which is planted the flowers or other plants.

Such forms as shown in Fig. 3 must have a small portion of the top of turf left untied till the earth is filled into the space within, after which it is tied up to the point as shown; and, in planting in such forms, small holes are made with a suitable instrument on the top or sides for the insertion of the seed or plant-roots.

It will be seen that any desired form may be made in the manner set forth. The turf may be made into long tubes, which may be joined together, forming a lattice-work, from all parts of which flowers, &c., may be grown.

Flower-pots, &c., made according to my invention are, in themselves, a source of nourishment to the plants. They may be highly ornamented by vines or flowers planted over the outer sides. They have a superior advantage over ordinary pots in propagating and transplanting, as the pot with the plant may be set in the ground together, and the roots of the plant will pass through the turf. In keeping the plant properly watered, the turf will also be dampened and the grass will grow, so as soon to make the pot green and beautiful.

In the formation of some kinds of vessels it is often found desirable to unite the edges of the turf by sewing with needle and cord; but, ordinarily, this is not required.

It will be seen that the pot, vase, or form made according to the mode hereinbefore described is simple in structure, economical in manufacture, and useful as well as ornamental.

Having described my invention, what I claim, and desire to secure by Letters Patent, is—

As a new article of manufacture, a flower-pot, vase, or ornamental form made from turf or grass-sod, in the manner as set forth.

In testimony that I claim the foregoing as my own I affix my signature in presence of two witnesses.

ALFRED D. LEE.

Witnesses:
T. SOMERVILLE,
ALEXANDER SCOTT.